(No Model.) 6 Sheets—Sheet 1.

P. WRIGHT.
TRANSFORMER SYSTEM OF ELECTRICAL DISTRIBUTION.

No. 521,925. Patented June 26, 1894.

Witnesses:
Hermann Bormann
Katie M. Gilligan

Inventor:
Peter Wright.
By Augustus B. S. Troughton
Att'y.

(No Model.) 6 Sheets—Sheet 3.
P. WRIGHT.
TRANSFORMER SYSTEM OF ELECTRICAL DISTRIBUTION.
No. 521,925. Patented June 26, 1894.

Witnesses:
Hermann Bormann
K. M. Gilligan

Inventor:
Peter Wright
By Augustus B. Stoughton
Att'y (No Model.) 6 Sheets—Sheet 4.
P. WRIGHT.
TRANSFORMER SYSTEM OF ELECTRICAL DISTRIBUTION.

No. 521,925. Patented June 26, 1894.

Witnesses:
Hermann Bormann
K. M. Gilligan

Inventor:
Peter Wright
By Augustus B. Stoughton
Atty

(No Model.) 6 Sheets—Sheet 5.

P. WRIGHT.
TRANSFORMER SYSTEM OF ELECTRICAL DISTRIBUTION.

No. 521,925. Patented June 26, 1894.

Witnesses:
Hermann Bormann
K. M. Gilligan

Inventor:
Peter Wright
By Augustus B. Stoughton
Att'y

(No Model.) 6 Sheets—Sheet 6.

P. WRIGHT.
TRANSFORMER SYSTEM OF ELECTRICAL DISTRIBUTION.

No. 521,925. Patented June 26, 1894.

Witnesses:
Hermann Bormann
Katie M. Gilligan

Inventor:
Peter Wright
By Augustus B. Stoughton
Att'y.

UNITED STATES PATENT OFFICE.

PETER WRIGHT, OF PHILADELPHIA, PENNSYLVANIA, ASSIGNOR TO THE UNITED GAS IMPROVEMENT COMPANY, OF SAME PLACE.

TRANSFORMER SYSTEM OF ELECTRICAL DISTRIBUTION.

SPECIFICATION forming part of Letters Patent No. 521,925, dated June 26, 1894.

Application filed January 3, 1894. Serial No. 495,519. (No model.)

*To all whom it may concern:*

Be it known that I, PETER WRIGHT, a citizen of the United States, residing at the city of Philadelphia, in the county of Philadelphia and State of Pennsylvania, have invented certain new and useful Improvements in Transformer Systems of Electrical Distribution, of which the following is a specification.

Hitherto it has been customary to employ a transformer of sufficient capacity for supplying the maximum requirements of the secondary circuit; however in practice, for example, in electric lighting, it frequently happens that the maximum requirements of the secondary circuit are reached for a comparatively small portion of the time. During the remainder of the time, i. e. when the secondary circuit is not working at its maximum capacity, there exists a considerable loss or waste in the primary circuit due to the fact that the capacity of the transformer is too great in proportion to the work being done by the secondary circuit.

The principal objects of my present invention are, first, to obviate the above mentioned waste and to provide several transformers that are automatically called upon to energize the secondary circuit or are automatically cut out therefrom according as the latter is called upon to do more or less work; second, to construct and arrange these several transformers in such manner that they are automatically cut into or out of action by the increase or decrease of current due to an increase or decrease of work required of the secondary circuit, and third, to prevent short circuiting the secondary circuit of one transformer through the secondary circuit or secondary coils of the other, by closing the primary circuit of all additional transformers before closing their secondary circuits and by opening their secondary circuits before opening their primary circuits, whereby the liability of the occurrence of a destructive spark is reduced because there is always a closed circuit through one transformer.

My invention consists of the improvements hereinafter described and particularly referred to in the claims.

The nature, characteristic features, and scope of my invention will be more fully understood from the following description taken in connection with the accompanying drawings forming part hereof and in which—

In the drawings, $a$ and $a'$, (Figs. 5, 6, 10, and 15) are the conductors of a line circuit, which, in practice, is usually located in a street or highway.

$b$ and $b'$, are transformers of which $b$, is assumed to be of the capacity required for lighting a certain number of lamps for example, the lamps $x$ and $x'$, and of which $b$ and $b'$, taken together are assumed to be of the capacity required for lighting the lamps $x$ and $x'$, and also the lamps $x^2, x^3$, and $x^4$, or in other words, doing the maximum of work. The primary coil $b^2$, of the transformer $b$, is included in the line circuit $a\ a'$, by means of conductors $b^3$ and $b^4$, and the primary coil $b^5$, of the transformer $b'$, is included in or excluded from the line circuit $a\ a'$, according as its conductors $b^6$ and $b^7$, are electrically connected or are insulated from each other.

One of the respective ends of each of the secondary coils $b^8$ and $b^9$, of the transformers $b$ and $b'$, are connected with the secondary or lamp circuit $e\ e'$, by means of conductors $b^{10}$ and $b^{11}$. The other end of the coil $b^8$, is connected with the secondary circuit $e\ e'$, by means of a conductor $b^{12}$, and the other end of the coil $b^9$, is connected with or disconnected from the secondary or lamp circuit $e\ e'$, according as the two parts of the conductor $b^{13}$, are in electrical connection with or are insulated from each other.

Figures 7, 8, 9:
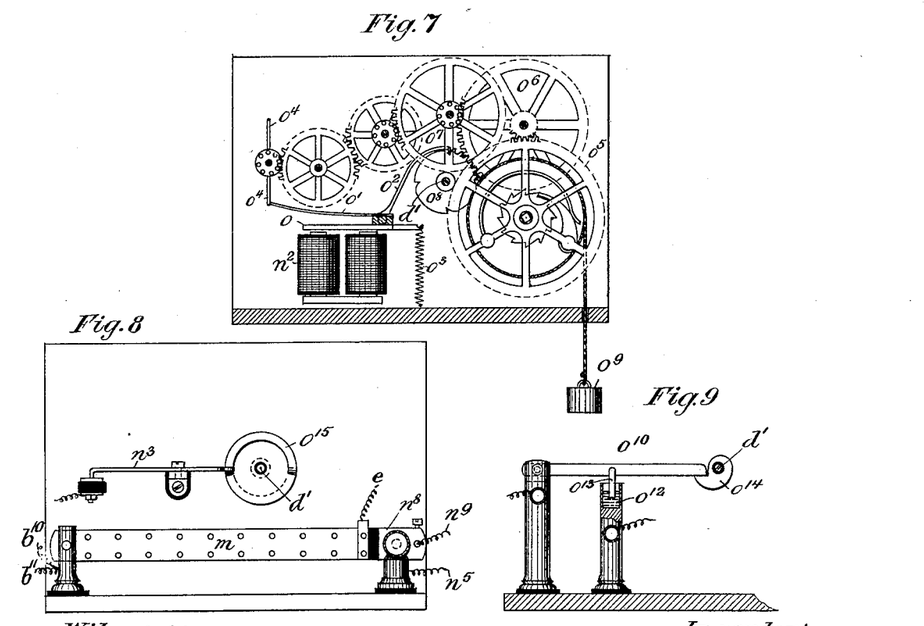
Fig. 7, is a view of a train of gears operated by weight and adapted to drive the shaft illustrated in Fig. 6.
Fig. 8, is an end elevational view of the circuit breaker illustrated in Fig. 6.
Fig. 9, is an elevational view of the snap switches and certain of their accessories, shown in Fig. 6.

It may be remarked that the two portions of the primary circuit $b^6$ and $b^7$, should be connected before the two portions $b^{13}$, of the secondary circuit are connected together in order to avoid shunting or short circuiting the secondary circuit of the transformer $b$, through the secondary coil $b^9$, of the transformer $b'$, and it may also be remarked that the two portions $b^{13}$, of the secondary circuit should be opened or disconnected before the two portions of the primary circuit $b^6$ and $b^7$, are opened or disconnected. It will be obvious that this arrangement reduces the liability of the occurrence of a destructive spark because there is always a closed circuit through one transformer. Of course various types of switches for example, mercury or snap switches, Figs. 6 and 9, may be employed for this purpose. However, in Figs. 3, 5, 10, 14, and 15 of the drawings, I have illustrated a revoluble insulating cylinder $d$, provided upon its curved surface with conducting bridge pieces $c$ and $c'$, adapted to contact with brushes or other terminals applied to the ends of the respective parts of the conductors of the primary and secondary circuits of the transformer $b'$. The bridge piece $c$, is wider than the bridge piece $c'$, and in such manner that the bridge piece $c$, closes its corresponding primary circuit before the bridge piece $c'$, closes its corresponding secondary circuit, and the bridge piece $c'$, opens its corresponding secondary circuit before the bridge piece $c$, opens its corresponding primary circuit. This switch for controlling the circuits $b^6$, $b^7$, and $b^{13}$, may, of course, be operated or shifted through the intervention of various types of mechanism, for example, through the intervention of a small motor, Figs. 10 and 15, or weight, Figs. 6 and 7.

Figure 1:
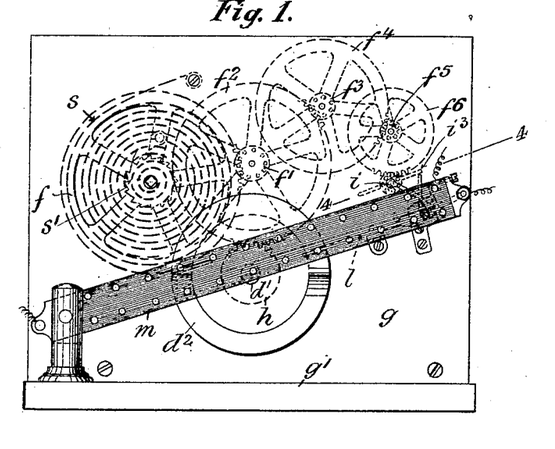
Figure 1, is an end elevation showing portions of a switch adapted to respond to changes in the secondary current and to cut the primary and secondary coils of one of the transformers into and out of circuit.
Figure 2:
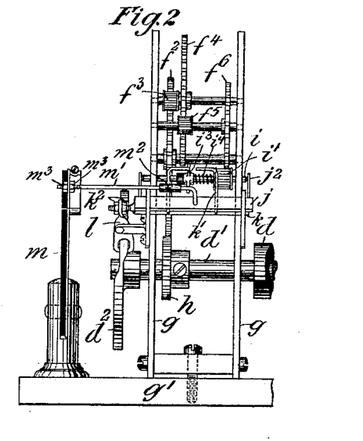
Fig. 2, is a front elevational view of portions of the same.
Figure 3:
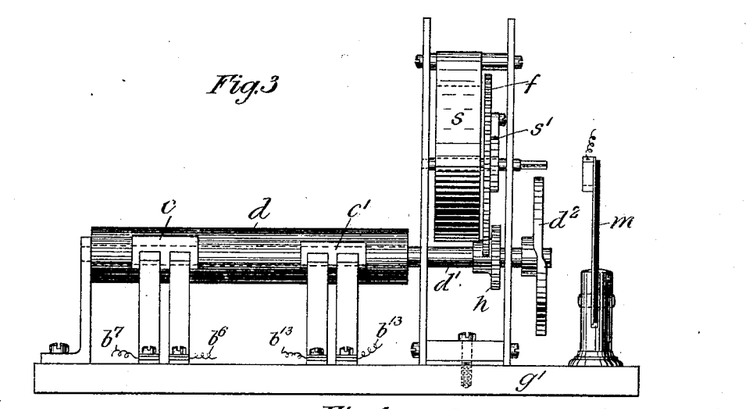
Fig. 3, is a rear elevational view of the same, showing the spring contacts and conducting bridge pieces and insulating cylinder, whereby the primary and secondary coils are cut out of and into action.
Figure 4:
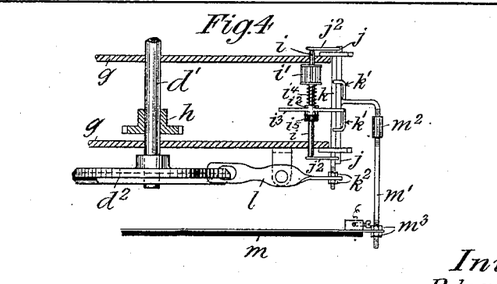
Fig. 4, is a sectional view taken on the line 4—4 of Fig. 1.

As illustrated in Figs. 1 to 5, use is made of the following mechanism which may be inclosed in a suitable housing or case, not shown, for rotating the cylinder $d$. $f, f', f^2, f^3, f^4, f^5$, and $f^6$, are a train of intermeshing gears or spur wheels revolubly supported between plates $g$, and actuated by means of a spiral spring $s$, that may be wound up through the intervention of pawl-and-ratchet connections $s'$, by means of a suitable key, or that may be made self-winding by means of suitable well understood electro magnetic devices. If preferred, any other prime mover, such as a weight or motor may be employed for driving a train of gearing. Instances of such construction are hereinafter described and are illustrated in Sheets 3, 4, and 5, of the accompanying drawings. $h$, is a pinion keyed to the shaft $d'$, of the insulating cylinder $d$, and meshing with the spur wheel $f^2$, so that when the train of gears is in motion, the insulating cylinder is caused to revolve in a clockwise direction, thus making and breaking the primary and secondary circuits of the transformers $b$ and $b'$. $i$, is a revoluble spindle mounted in the plates $g$, in such manner that its respective extremities project beyond the same as shown in Figs. 2 and 4, and in such manner that it is allowed a range of play in the direction of its length. This spindle $i$, is provided with a tight or keyed lantern-wheel $i'$, meshing with the spur-wheel $f^6$, in all positions of the spindle $i$. Upon the spindle $i$, is mounted a sleeve $i^2$, afforded a range of endwise play but constrained to rotate with the spindle. This sleeve $i^2$, is provided with radial arms $i^3$, and is normally solicited by means of a spring $i^4$, against a collar $i^5$, fast on the spindle. $j$, is a shipper-rod afforded a range of endwise movement and provided with arms or projections $j^2$, adapted to contact with the ends of the spindle $i$. $k$, is a sliding bar provided with fingers or stop pins $k'$, adapted to be brought into engagement with the radial arms $i^3$, in order to check the movements of the gears $f, f', f^2, f^3, f^4, f^5$, and $f^6$. From the foregoing description, it will be obvious that the fingers or stop pins $k'$, may be caused to engage the radial arms $i^3$, either by shifting the sliding bar, $k$, or by shifting the spindle $i$. The former result is accomplished by means of a cam-faced wheel $d^2$, mounted fast upon the shaft $d'$, and running between the forked or bifurcated end of a centrally pivoted lever $l$, the other end of which is provided with an opening through which passes the threaded end of the sliding bar $k$. $k^2$, are nuts for permitting of the adjustment of the throw of the sliding bar $k$, in order to insure the proper timing of the operations of the device. The required movements of the shipper-rod $j$, are effected by means of a device $m$, responding to changes in the current of the secondary or lamp circuit $e\ e'$. In the present instance the device $m$, comprises a thermostat secured at one end to an insulating binding post carried by the base $g'$, and connected at its other end with the shipper-rod $j$, through the intervention of a rod $m'$, having a section of insulating material $m^2$, interposed therein.

While I have shown in the accompanying drawings an exceedingly simple form of thermostat, still I wish it to be distinctly understood that I do not limit myself to such form of thermostat, as many known types of so-called "compensating" thermostats may be employed.

$m^3$, are nuts for adjusting the throw of the shipper-rod $j$, in order to insure the proper operations of the device. It may be remarked that the spring $i^4$, by yielding prevents injury of the fingers $k'$, and radial arms $i^3$.

The thermostat shown in the drawings comprises two sheets of material whereof one is of greater electrical conductivity than the other, and its free end is shifted toward the right in Fig. 2, when the current traversing it is considerable and corresponds to that which would be beyond the capacity of the transformer $b$, that is to what would be required to light all the lamps, and toward the left in said figure when the current traversing it is less and corresponds to that required by the lesser number of lamps, in the present instance the lamps $x\ x'$.

Figure 5:
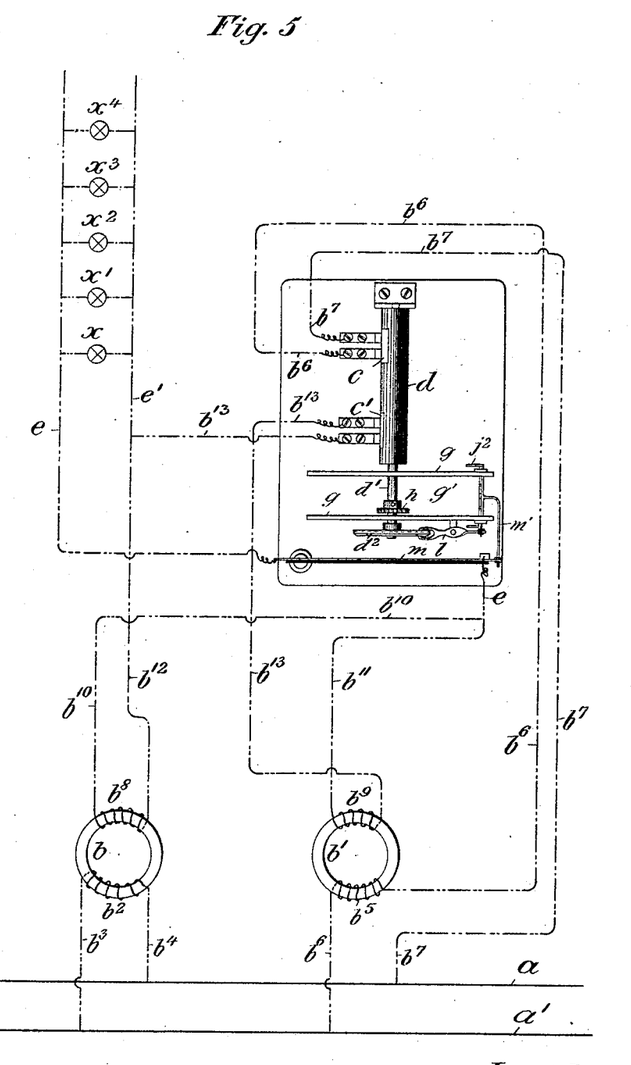
Fig. 5, is a diagrammatic illustration showing a switch, spring driven gearing, and thermostat of Figs. 1 to 4, in application to circuits arranged according to my invention.
Figure 6:
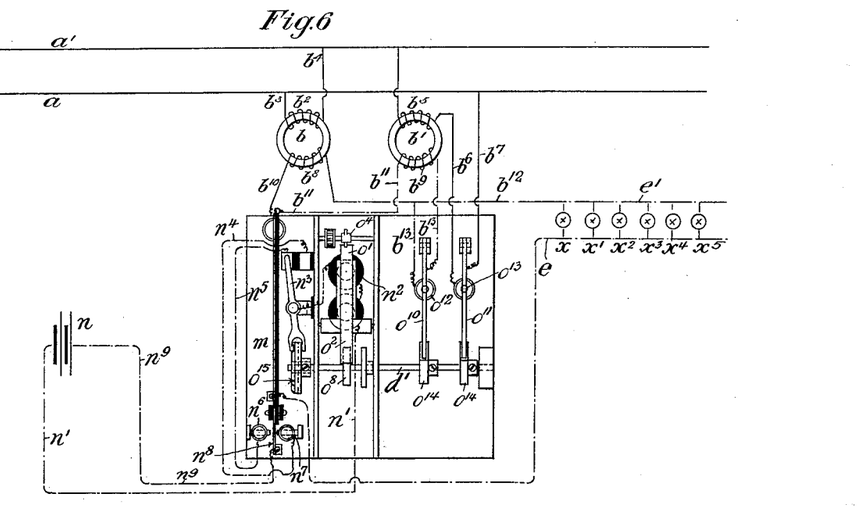
Fig. 6, is a similar view of a modification of my invention in which use is made of a local circuit electro magnet and circuit breaker controlled by the thermostat and adapted to permit of the starting and stopping of a train of gears operated by weight and in which use is also made of mercury contact snap switches for the transformer circuits.

The mode of operation of my improved transformer system of electrical distribution, as illustrated in Figs. 1 to 5, may be described as follows: When the primary circuit $e\ e'$, is required to do a comparatively small amount of work, for example, to light the lamps $x x'$, the transformer $b$, supplies all the current and the primary and secondary circuits of the transformer $b'$, are both interrupted by means of the switch $d$. Assuming that the lamp circuit $e\ e'$, is called upon to do more work and consequently to carry more current, for example, by the lighting of the lamps $x^2$, $x^3$ and $x^4$, in addition to the lamps $x$ and $x'$, it follows that an increase of current traverses the device $m$. This device $m$, responds to the increase of current and its free end is deflected thereby, toward the right in Fig. 2. This movement of the free end of the device $m$, causes the shipper-rod $j$, and with it the arms $j^2$, to be shifted and to shift the spindle $i$, toward the right, whereby the arm $i^3$, is moved clear of the stop pin or finger $k'$, thus permitting of the movement of the train of gears $f, f', f^2, f^3, f^4, f^5$, and $f^6$, and consequent rotation of the shaft $d'$. The revolution of the shaft $d'$, causes the cylinder $d$, to be rotated in a clockwise direction with the result that the primary circuit of the transformer $b'$, is first closed by the conducting bridge piece $c$, and the secondary circuit of the transformer $b'$, is subsequently closed by the bridge piece $c'$, thus bringing the transformer $b'$, into action and insuring the requisite supply of current to the lamp circuit $e\ e'$, as shown in Fig. 5. As soon as the primary and secondary circuits of the transformer $b'$, have been closed, the continued rotation of the shaft $d'$, and cam-wheel $d^2$, causes the latter to shift the sliding bar $k$, toward the left in Fig. 2, with the result that the end of its left hand finger or stop pin $k'$, engages the radial arm $i^3$, thus checking the movement of the train of gears and parts actuated thereby. Should the quantity of current required by the lamp circuit $e\ e'$, be diminished, for example, by the extinguishment of the lamps $x^2$, $x^3$ and $x^4$, then the current traversing the device $m$, will also be diminished whereby the free end of this device will be returned automatically toward the left in Fig. 2, to its original position. This movement of the free end of the device $m$, causes the spindle $i$, to be shifted toward the left, so that its radial arm $i^3$, is clear of the right hand stop pin or finger $k'$, whereupon the train of gears is again permitted to move and to revolve the shaft $d'$. This further revolution of the shaft $d'$ causes the primary and secondary circuits of the transformer $b'$, to be interrupted by the insulating portions of the cylinder $d$, whereby the transformer $b'$, is automatically cut out of action. This revolution of the shaft $d'$, also causes the cam-wheel $d^2$, to shift the left-hand stop pin or finger $k'$, into engagement with one of the radial arms $i^3$, whereby the train of gears is brought to rest, thus permitting the transformer $b'$, to remain out of action until the current traversing the device $m$, again increases and consequently operates to cut the transformer $b'$, again into action in the manner above set forth.

Referring now to Figs. 6 to 9 inclusive, which embody my invention and illustrate the use of snap switches, propelling weight, and a local battery circuit and its accessories, $n$, is a local battery or other source of electric energy. One conductor $n'$, of this battery traverses the coils of electro magnets $n^2$, and proceeds thence to the centrally pivoted and insulated tongue $n^3$, thence by the contacts and conductors $n^4$ or $n^5$, (according to the position of the tongue) to the back stops $n^6$ and $n^7$, and thence by a conducting plate $n^8$, carried by and insulated from the thermostat $m$, and by the conductor $n^9$, to the battery $n$. The electro magnet $n^2$, is provided with a centrally pivoted armature lever $o$, having two arms or fingers $o'$ and $o^2$, whereof the finger $o'$, is normally solicited by a spring $o^3$, into range of arms $o^4$, projecting from a spindle driven through the intervention of a train of gearing $o^5$, $o^6$, and $o^7$, and whereof the other finger $o^2$, rides upon a cam-wheel $o^8$, also driven by the gearing. $o^9$, is a weight for imparting motion to the gearing. $o^{10}$ and $o^{11}$, are snap switches provided with mercury cups $o^{12}$, Fig. 9, and with centrally disposed contacts $o^{13}$. These snap switches are operated by means of cams $o^{14}$, mounted on the shaft $d'$, which latter is positively driven by means of the train of gears. $o^{15}$, is a cam-wheel mounted upon the shaft $d'$, and adapted to run between the forked end of the tongue $n^3$, and thus shift the latter in such manner that its other end is caused to rest alternately upon the contacts or terminals of the conductors $n^4$ and $n^5$. For the sake of a further description, it will be assumed that all the lamps $x, x', x^2, x^3, x^4$, are being supplied with current from both the transformers $b$ and $b'$. When the lamps $x^2$, $x^3$ and $x^4$, are extinguished, the current traversing the thermostat $m$, will be diminished, whereupon the free end of the thermostat is shifted toward the left, so that the conducting plate $n^8$, is brought into contact with the back stop $n^6$. Under these circumstances, the local battery circuit traverses the conductor $n'$, coils of electro magnet $n^2$, tongue $n^3$, conductor $n^5$, back stop $n^6$, plate $n^8$, and conductor $n^9$. This current causes the armature $n^2$, to be attracted, thus shifting the finger $o'$, clear of the arms $o^4$, and also raising the finger $o^2$, out of the low part of the cam $o^8$. The train of gears being thus released is rotated under the influence of the weight $o^9$, and causes revolution of the shaft $d'$ and cam-wheel $o^8$. The revolution of the shaft $d'$, is productive of the following results: First, it causes the cams $o^{14}$, to lift the snap switches $o^{10}$ and $o^{11}$, to break the primary and secondary circuits of the transformer $b'$, in the manner above described, that is to break the secondary before the primary; second, it causes the cam-wheel $o^{15}$, to transfer the tongue $n^3$, from the contact of the conductor $n^5$, thus breaking the local circuit of the conductor $n^4$, and, third, it causes the finger $o^2$, to ride upon the high part of the cam $o^8$, until the completion of the foregoing operations, whereupon the finger $o^2$, falls into a low part of the cam $o^8$, thus permitting the finger $o'$, moving under the influence of the spring $o^3$, to engage the arms $o^4$, and thus arrest the mechanism. For the sake of a further description, it will be assumed that the lamps $x^2$, $x^3$ and $x^4$, are again turned on. Under these circumstances, the increase of current traversing the thermostat $m$, causes the plate $n^8$, to be brought into contact with the back stop $n^7$, thus completing the local circuit and permitting the mechanism to rotate and subsequently arrest the shaft $d'$, in the manner above described but in such position that the snap switches $o^{10}$ and $o^{11}$, close their respective circuits. In this connection, it may be remarked that the particular type of circuit breaker $n^3$, above described, is not essential, as other forms of circuit breakers, for example, those shown on Sheets 4 and 5 of the drawings and hereinafter described, may be employed.

In Figs. 10 to 14, use is made of an electric motor A, and of a condenser B, in parallel with the line circuit $a\, a'$, by means of conductors $p$ and $p'$. Of course the condenser B, may be in series in the line $a\, a'$. The motor A, drives the shaft $d'$, through the intervention of suitable differential gearing, for example, that shown in Fig. 11. In this instance, the shaft $d'$, is provided with an insulating cylinder $d$, hereinbefore described in connection with Figs. 1 to 5, however, if preferred, use might be made of snap switches, such for example as are illustrated in Figs. 6 and 9. The shaft $d'$, is also provided with an automatic circuit breaker, and, in the present instance, this circuit breaker comprises an insulated disk $d^2$, having upon its face overlapping conducting segments $p^3$ and $p^{14}$, of different radii, Fig. 12, and having a hub $p^4$, Fig. 13, in electrical connection with each of said segments, and it also comprises spring contacts $p^5$, $p^6$ and $p^7$, co-operating with said hub and conducting segments.

The mode of operation of the apparatus illustrated in Figs. 10 to 14, may be described as follows: When the free end of the thermostat is deflected toward the left, for example, by the extinguishment of the lamps $x^2$, $x^3$, and $x^4$, current is supplied to the motor by the conductor $p^8$, plate $n^8$, back stop $n^6$, conductor $p^9$, spring $p^7$, segment $p^3$, hub $p^4$, spring $p^5$, and conductors $p^{10}$ and $p^{11}$. Under these circumstances, the motor is set in motion and drives the shaft $d'$, through the intervention of the gearing illustrated in Fig. 11, thus causing the switch $d$, to break the respective circuits of the transformer $b'$, thus cutting it out of action, the rotation of the shaft $d'$, also causes the disk $p^2$, to turn in the direction indicated by the arrow, Fig. 12, thus permitting the contacting spring $p^7$, to ride onto a portion of the disk and thus break the circuit through the motor, whereby the same comes to rest. If the free end of the thermostat $m$, should now be deflected toward the right, for example, by the lighting of the lamps $x^2$, $x^3$ and $x^4$, current would be supplied to the motor A, through the condenser B, by the conductor $p^8$, plate $n^8$, back stop $n^7$, conductor $p^{12}$, spring $p^6$, segment $p^{14}$, hub $p^4$, and conductors $p^{10}$ and $p^{11}$, to the condenser. Under these circumstances, the motor A, would again drive the shaft $d'$, and cause the cylinder $d$, to complete the circuits of the transformer $b'$, and subsequently cause the circuit breaker to again arrest the motor by interrupting its circuit.

Figures 10, 11:
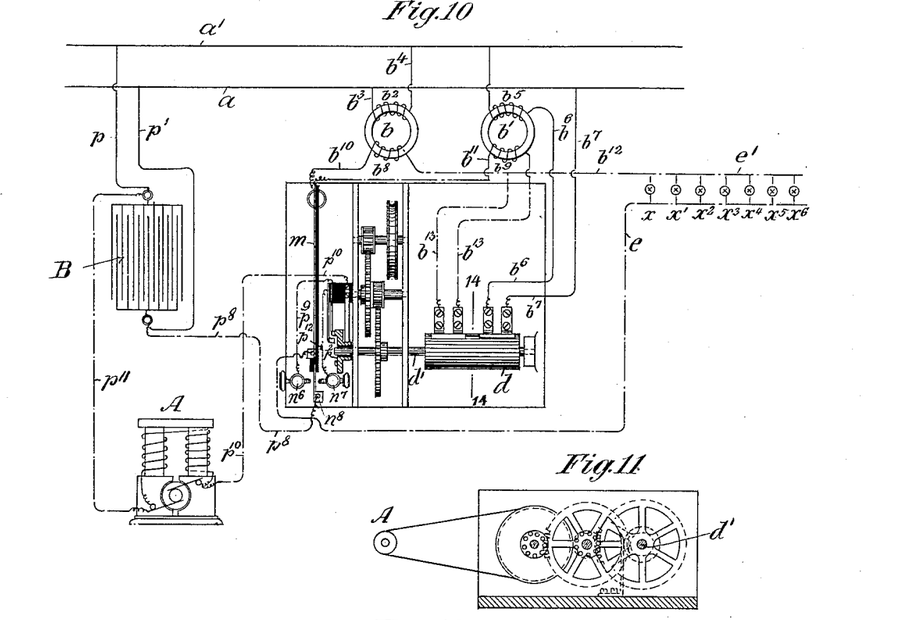
Fig. 10, is a diagrammatic view illustrating an arrangement embodying features of my invention and in which use is made of an electric motor and condenser operated from the line current and adapted to actuate the transformer switches.
Fig. 11, is an elevational view of a portion of the intermediate driving mechanism shown in Fig. 10.
Figure 12:
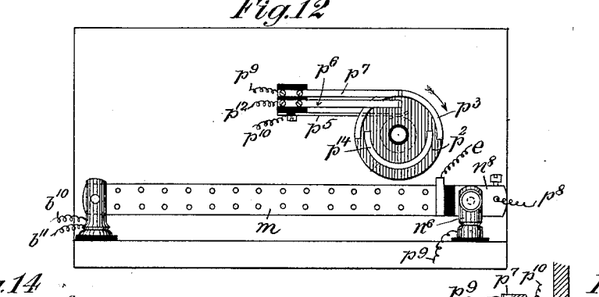
Fig. 12, is an elevational view of the circuit breaker illustrated in Fig. 10.
Figure 13:
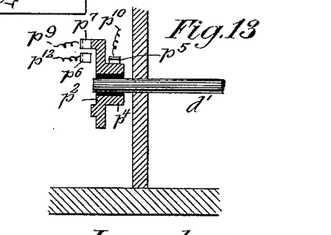
Fig. 13, is a sectional view of the circuit breaker shown in Fig. 12.
Figure 14:
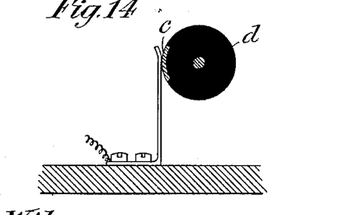
Fig. 14, is a section taken on the line 14—14, of Fig. 10.
Figure 15:
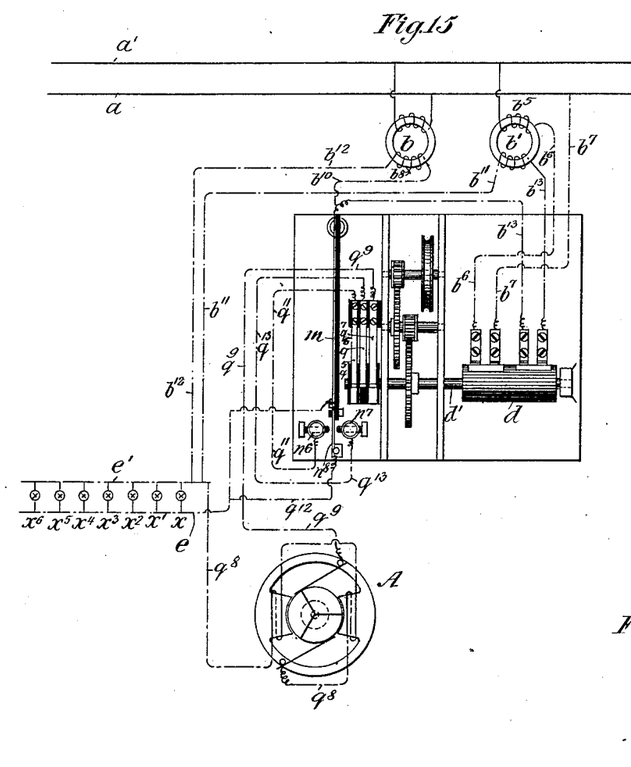
Fig. 15, is a diagrammatic view illustrating my invention and showing a motor operated by the secondary circuit of the transformer.
Figure 16:
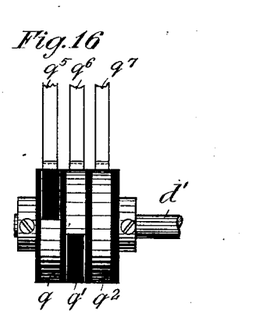
Figs. 16 to 18, are views illustrating the automatic circuit breaker shown in Fig. 15, and Figs. 19 and 20, are views illustrating the employment of a motor operated by electro magnets.
Figure 17:
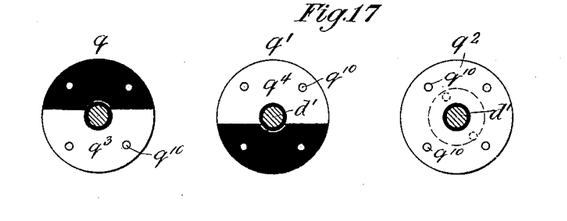
Figure 18:
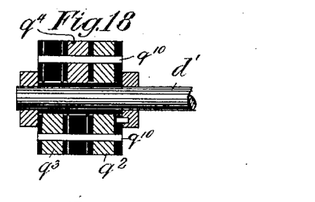

Referring now to Fig. 15, the condenser or local battery is dispensed with and the motor is driven by current derived from the secondary circuits. The motor in its turn drives the shaft $d'$, through the intervention of suitable differential gearing, such, for instance, as is illustrated in Fig. 11. In this figure I have shown a slightly different form of circuit breaker, however, the forms of circuit breaker hereinbefore described, may, if preferred, be used. The circuit breaker illustrated in Fig. 15, comprises three disks $q$, $q'$ and $q^2$, mounted side by side, Figs. 16 to 18 inclusive and insulated from each other by the interposition of suitable material. The disks $q$ and $q'$, are provided respectively with conducting segments $q^3$ and $q^4$, disposed opposite each other, and the disk $q^2$, is composed wholly of conducting material and is in electrical connection with each of the conducting segments $q^3$ and $q^4$. This circuit is, of course, provided with contact springs $q^5$, $q^6$ and $q^7$. When the free end of the thermostat is deflected toward the left, for example by the extinguishment of the lamps $x^2$, $x^3$ and $x^4$, current is supplied to the motor from the lamp circuit $e\ e'$, or in other words, from the primary circuit of the transformers $b\ b'$, by a conductor $q^8$, a conductor $q^9$, contact spring $q^7$, disk $q^2$, transverse rods $q^{10}$, conducting segment $q^3$, of disk $q$, contact spring $q^5$, conductor $q^{11}$, back stop $n^6$, plate $n^8$, conductor $q^{12}$, to the other conductor or side of the lamp circuit. Under these circumstances, the motor A, causes revolution of the shaft $d'$, thus serving to interrupt the primary and secondary circuits of the transformer $b'$, either by means of the insulating cylinder $d$, as shown, or by means of snap switches as has been hereinbefore explained. The rotation of the shaft $d'$, subsequently causes the contact spring $q^7$, to ride upon the insulating portion of the disk $q$, whereupon the local circuit is broken and the motor consequently permitted to come to rest. When the free end of the thermostat $m$, is deflected toward the right, for instance by the inclusion of the lamps $x^2$, $x^3$ and $x^4$, current is supplied to the motor A, from the lamp circuit by the conductors $q^8$ and $q^9$, contact spring $q^7$, disk $q^2$, rods $q^{10}$, insulated portion $q^4$, disk $q'$, spring contact $q^6$, conductor $q^{13}$, back stop $n^7$, plate $n^8$, and conductor $q^{12}$. Under these circumstances the motor A, again rotates the shaft $d'$, thus causing the closing of the primary and secondary circuits of the transformer $b'$, and subsequently causing the circuit breaker to interrupt the local circuit at the disk $q'$, whereby the motor is permitted to again come to rest.

Figure 19:
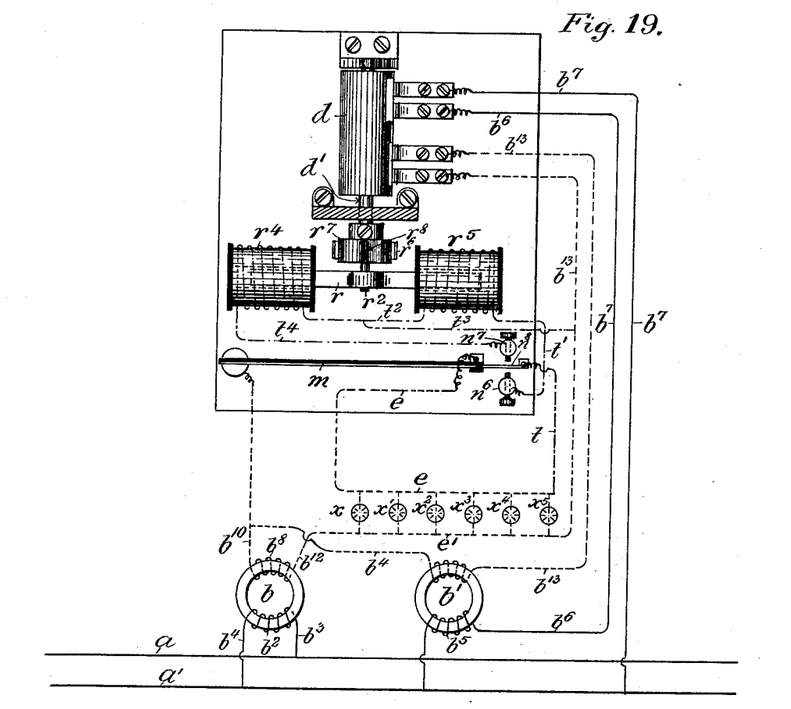
Figure 20:
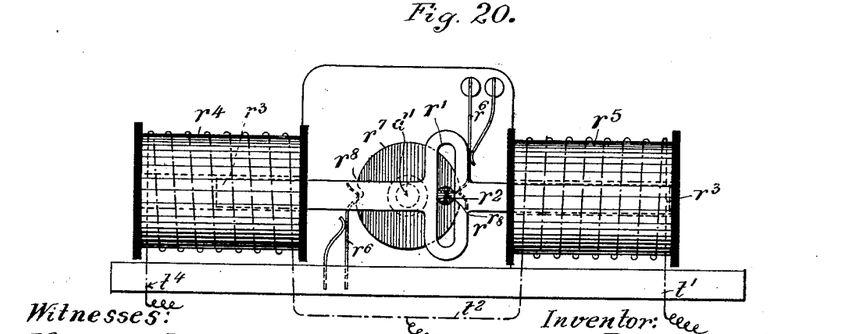

In Figs. 19 and 20, use is made of a cross-head $r$, transversely slotted as at $r'$, for the accommodation of a crank-pin $r^2$, by means of which the shaft $d'$, and cylinder $d$, are rotated. This cross-head $r$, is provided upon its opposite sides with cores $r^3$, that constitute parts of the solenoids $r^4$ and $r^5$. $r^6$, are springs that press with their free extremities upon a disk or wheel $r^7$, keyed to the shaft $d'$, and provided with peripheral notches $r^8$, into which the ends of the springs $r^6$, are adapted to take and thus prevent the disk or wheel $r^7$, from coming to rest with the crank pin $r^2$, in line with the cores $r^3$, or in other words upon a "dead center." The disposition of the line, lamp, primary and secondary transformer circuits are the same in Figs. 19 and 20, as in certain of the preceding figures and consequently corresponding parts thereof are designated by the same reference letters and further description is unnecessary. When the free end of the thermostatic device $m$, is deflected downward, for example by reason of the extinguishment of a portion $x^2$, $x^3$, $x^4$ and $x^5$, of the lamps, a circuit derived from one side of the lamp circuit is closed through the conductor $t$, conducting plate $n^8$, back stop $n^6$, conductor $t'$, coils of solenoid $r^5$, conductors $t^2$ and $t^3$, and back to the other side of the lamp circuit, as illustrated in Fig. 19, by way of the conductor $b^{13}$. Under these circumstances, the solenoid $r^5$, draws its core into its coils as shown in Fig. 20, thus causing the cross-head and crank pin $r^2$, to turn the cylinder $d'$, into position for interrupting the primary and secondary circuits of the transformer $b'$, in the manner above described, whereby this transformer is cut out of action. In this connection it may be remarked, that the springs $r^6$, and peripherally notched wheel $r^7$, prevent the stoppage of the crank pin upon a dead center. When the free end of the thermostatic device $m$, is deflected upward (Fig. 19) for example, by reason of the lighting of the lamps $x^2$, $x^3$, $x^4$ and $x^5$, the circuit derived as before from the side $e$, of the lamp circuit by way of the conductor $t$, and conducting plate $n^8$, is completed through the back stop $n^7$, conductor $t^4$, and coils of the solenoid $r^4$, and thence as before through the conductors $t^2$, $t^3$ and $b^{13}$, to the other side $e'$, of the lamp circuit. Under these circumstances the solenoid shifts the cross head toward the left in Fig. 20, thus causing the cylinder $d$, to be turned back into position for again closing the primary and secondary circuits of the transformer $b'$, whereby the latter is automatically brought into action.

It will be obvious to those skilled in the art to which my invention appertains that modifications may be made in details without departing from the spirit thereof, hence I do not limit myself to the precise construction and arrangement of parts hereinabove set forth, but

Having thus described the nature and objects of my present invention, what I claim as new, and desire to secure by Letters Patent, is—

1. A transformer system of electrical distribution comprising, several transformers, and a switch responding to changes in current and adapted to automatically interrupt the secondary circuit before interrupting the primary circuit and to close the primary circuit before closing the secondary circuit of one of the transformers, substantially as described.

2. A transformer system of electrical distribution comprising, several transformers, and a switch responding to changes in current in the secondary circuit and adapted to automatically interrupt the secondary circuit before interrupting the primary circuit and to close the primary circuit before closing the secondary circuit of one of the transformers, substantially as described.

3. A transformer system of electrical distribution comprising, two transformers having independently energized primary coils and having their secondary coils adapted for inclusion in and exclusion from the same secondary circuit, and a switch responding to changes in the current of the secondary circuit and adapted to automatically close the primary circuit of one of the transformers before closing its secondary circuit and to open the secondary circuit before opening the primary circuit of the last mentioned transformer, substantially as described.

4. A transformer system of electrical distribution comprising, a secondary circuit, two or more transformers for supplying current to said circuit, and a switch responding to changes in the current of said circuit and operating to automatically open the secondary circuit and to subsequently cut out one or more of said transformers and to cut one or more of said transformers into action before closing its or their secondary circuit or circuits, substantially as described.

5. In a transformer system of electrical distribution, a switch tending to make and break the primary and secondary circuits of a transformer, and a thermostatic device responding to changes in current and adapted to release said switch, substantially as described.

6. In a transformer system of electrical distribution, a switch tending to make and break the primary and secondary circuits of a transformer, a thermostatic device responding to changes in current and adapted to release said switch, and a positively driven cam-wheel and its sliding bar and stop fingers for automatically arresting said switch, substantially as described.

7. In a transformer system of electrical distribution, a switch operated by positively driven gearing adapted to rotate an endwise movable spindle having radial arms, a shipper rod having arms disposed in range of the ends of said spindle, a sliding bar having stop fingers or pins adapted to contact with said radial arms, and a thermostat and cam-wheel for operating said sliding and shipper bars, substantially as described.

8. In a transformer system of electrical distribution, a transformer, and a device responding to changes of current and adapted to successively include and to successively exclude the primary and secondary coils of said transformer, whereby sparking and disruptive discharges are prevented, substantially as described.

9. In a transformer system of electrical distribution, a transformer, a revoluble shaft, means for actuating said shaft, a thermostatic device for controlling said shaft, and devices operated by said shaft and adapted to cut the said transformer into and out of action, substantially as described.

In testimony whereof I have hereunto signed my name in the presence of witnesses.

PETER WRIGHT.

Witnesses:
A. B. STOUGHTON,
K. M. GILLIGAN.